(12) United States Patent
Ito

(10) Patent No.: US 10,046,578 B2
(45) Date of Patent: Aug. 14, 2018

(54) IMAGE FORMING DEVICE AND METHOD FOR CONTROLLING IMAGE FORMING DEVICE WHICH COMPACT IMAGE DATA BASED ON AN AMOUNT OF THE IMAGE DATA ON A NEXT PAGE

(71) Applicant: KYOCERA Document Solutions Inc., Osaka (JP)

(72) Inventor: Takashi Ito, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/546,548

(22) PCT Filed: Jan. 25, 2016

(86) PCT No.: PCT/JP2016/051970
§ 371 (c)(1),
(2) Date: Jul. 26, 2017

(87) PCT Pub. No.: WO2016/121674
PCT Pub. Date: Aug. 4, 2016

(65) Prior Publication Data
US 2018/0015750 A1    Jan. 18, 2018

(30) Foreign Application Priority Data
Jan. 29, 2015 (JP) .................... 2015-015853

(51) Int. Cl.
| | |
|---|---|
| G06F 17/22 | (2006.01) |
| B41J 21/16 | (2006.01) |
| H04N 1/00 | (2006.01) |
| H04N 1/387 | (2006.01) |
| G06F 3/12 | (2006.01) |

(52) U.S. Cl.
CPC .......... *B41J 21/16* (2013.01); *G06F 17/2294* (2013.01); *H04N 1/0001* (2013.01); *H04N 1/3871* (2013.01); *G06F 3/1208* (2013.01); *G06F 3/1219* (2013.01)

(58) Field of Classification Search
None
See application file for complete search history.

(56) References Cited

U.S. PATENT DOCUMENTS

| | | | |
|---|---|---|---|
| 2009/0168107 A1* | 7/2009 | Takeuchi | H04N 1/233 358/1.18 |
| 2015/0092238 A1* | 4/2015 | Murata | G06K 15/1869 358/1.18 |

FOREIGN PATENT DOCUMENTS

JP    2003-208279 A    7/2003

* cited by examiner

Primary Examiner — Andrew H Lam
(74) Attorney, Agent, or Firm — Stein IP, LLC

(57) ABSTRACT

An image forming device includes an input unit to which image data are input, an image processing unit that performs image processing and generates output data, and an output unit that executes a job on the basis of the output data. The image processing unit, in a vertical width compaction process, recognizes a field enclosed by borders; determines whether the recognized field is a vertical width compaction candidate field; sets a vertical omission band in such a way as to include the blank and part of the border of the vertical width compaction candidate field, without eliminating information; eliminates the vertical omission band of the image data; and shifts and compacts the image data below the vertical omission band in the upward direction.

11 Claims, 12 Drawing Sheets

FIG.7

| TOTAL NUMBER OF PAGES | FIRST REFERENCE VALUE |
|---|---|
| 1~P1 | W1 |
| P1+1~P2 | W2 |
| P2+1~P3 | W3 |
| P3+1~P4 | W4 |
| ... | ... |
| Pn-1~Pn | Wn(UPPER LIMIT VALUE) |

※P1<P2<P3<P4···<Pn
　W1<W2<W3<W4···<Wn

FIG.8 (FIRST METHOD)

FIG.9 (SECOND METHOD)

IMAGE FORMING DEVICE AND METHOD FOR CONTROLLING IMAGE FORMING DEVICE WHICH COMPACT IMAGE DATA BASED ON AN AMOUNT OF THE IMAGE DATA ON A NEXT PAGE

CROSS-REFERENCE TO RELATED APPLICATIONS

This application is a national stage of International Application No. PCT/JP2016/051970, filed Jan. 25, 2016, which claims the benefit of priority to Japanese Application No. 2015-015853, filed Jan. 29, 2015, in the Japanese Patent Office, the disclosures of which are incorporated herein in their entireties by reference.

TECHNICAL FIELD

The present invention relates to an image forming device that performs image processing on input image data and outputs the result.

BACKGROUND ART

When performing printing based on image data having a little contents in the last page, a blank in the last page of the printed matter becomes quite large. A large blank means a small information quantity in the page. In order to avoid such printing like overflowing, Patent Document 1 describes an example of a device that performs printing in such a manner that a part overflowing to the last page is crammed into the previous page.

Specifically, Patent Document 1 describes a print control device that obtains print data, generates actual printing data to be output to a printer for printing by page unit, determines whether or not the data to be printed has another page of an overflowing part beyond estimated pages for printing based on the obtained print data, and generates the actual printing data for printing by page unit from the print data. Specifically, the data is reduced so that the printing is performed within the estimated pages (see claims 1, 8, 12, and the like of Patent Document 1).

LIST OF CITATIONS

Patent Literature

Patent Document 1: JP-A-2003-208279

SUMMARY OF THE INVENTION

Technical Problem

When performing printing based on image data having a little contents (characters, symbols, figures, and the like) in the last page, a blank in the last page of the printed matter becomes large. When a part of the image data in the page before the last page is eliminated by line unit so that the width is reduced in the upward direction, the last page having a large blank may be excluded from printing. As a result, the number of total pages of the image data is reduced so that the paper sheets to be used can be reduced. In addition, printing time is reduced, and hence wasteful power consumption in the image forming device can be eliminated. In addition, when a part of the image data in the page before the last page is eliminated by line unit so as to compact upward, data quantity of the image data can be reduced.

In the technique of Patent Document 1, when only a little contents are printed in the last page of the printed matter, the entire image data is reduced for printing. However, because the entire page is reduced, there is a problem that a form or format of the entire page may be largely changed or the printed matter may have impression to be largely different from the original.

A document may have a field enclosed by borders. Information such as characters, figures, or symbols is written in the field. However, the field may be a vacant field (a field without information or a blank field).

In view of the above-mentioned conventional problem, it is an object of the present invention to compact (fold) the vacant field so as to compact the width of the image data in the upward direction, to prevent that contents remains a little in the last page of the image data, and to reduce the number of total pages of the print output and data quantity of the image data.

Means for Solving the Problem

In order to achieve the above-mentioned object, an image forming device according to claim 1 includes an input unit, an image processing unit, and an output unit. The input unit receives image data for executing a job. The image processing unit performs image processing based on the image data input to the input unit and generates output data. In addition, the image processing unit performs a vertical width compaction process in the image processing, which includes recognizing a field enclosed by borders in a page of the image data, determining whether or not the recognized field is a vertical width compaction candidate field including a blank from left end to right end of the field, the blank having a predetermined width or more in the vertical direction, setting a band-like vertical omission band from the left end to the right end of the page overlapping an area of the determined vertical width compaction candidate field, setting the vertical omission band so as to include the blank and a part of borders of the vertical width compaction candidate field but not to delete information, and deleting the set vertical omission band in the image data so as to shift and compact the image data below the vertical omission band in the upward direction. The output unit performs the job based on the output data.

Advantageous Effects of the Invention

According to the present invention, width of the image data can be compacted in the vertical direction, and a vacant field can be compacted (folded). In addition, it is possible to avoid that a little contents remain in the last page of the image data, so as to reduce the number of total pages of the image data. As a result, it is possible to reduce the number of total pages in print output based on the image data or data quantity to be processed in the transmission job or the like.

BRIEF DESCRIPTION OF DRAWINGS

FIG. 7 is a diagram illustrating an example of setting a first reference value corresponding to the number of total pages of image data.

DESCRIPTION OF EMBODIMENTS

Hereinafter, with reference to FIGS. 1 to 13, an embodiment of the present invention is described. In the following description, a multifunction peripheral 100 (corresponding to an image forming device) is exemplified and described. However, elements such as structures and arrangements described in this embodiment should not be interpreted as limiting the claims, but are merely examples for description.

(Structure of Multifunction Peripheral 100)

Figure 1:
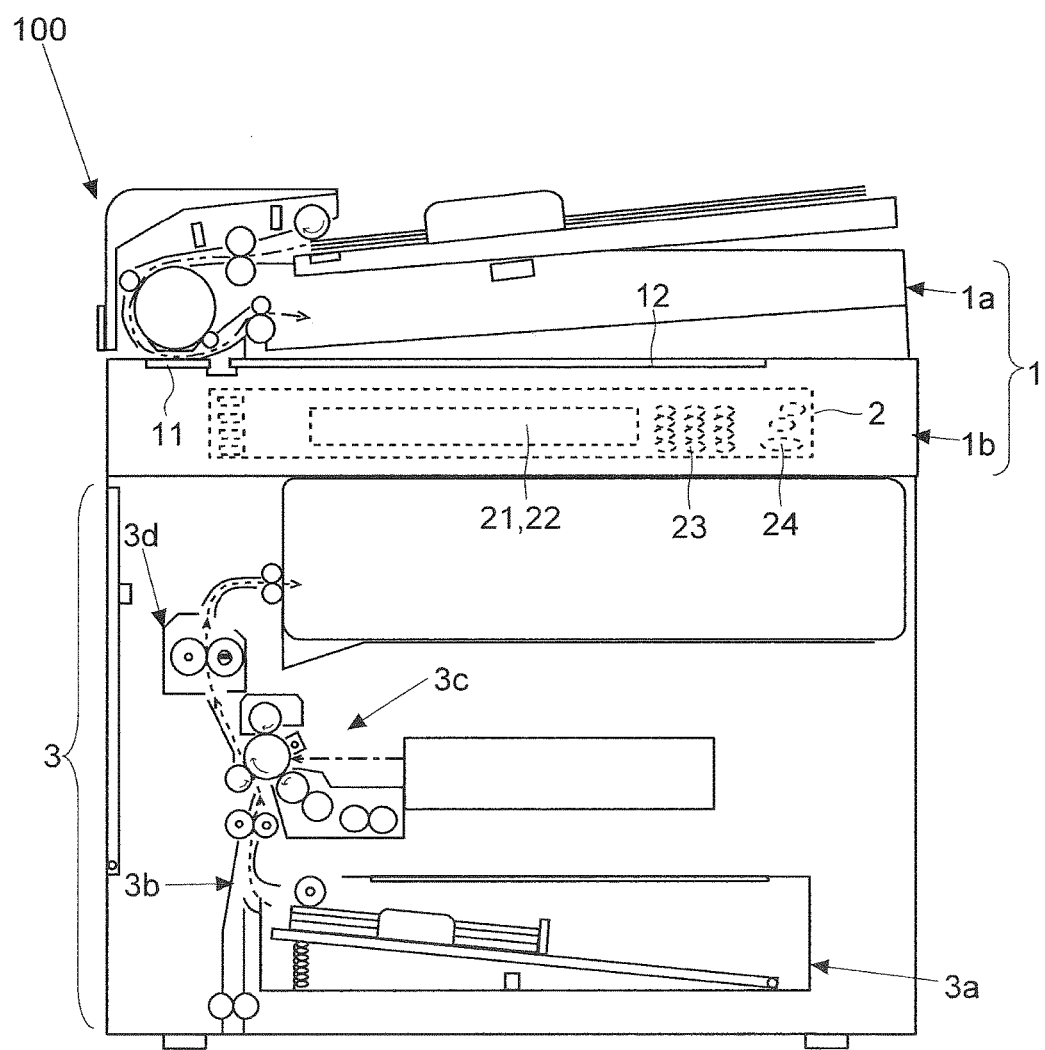
FIG. 1 is a diagram illustrating an example of a multifunction peripheral.

First, with reference to FIG. 1, outline of the multifunction peripheral 100 (image forming device) according to the embodiment is described. FIG. 1 is a diagram illustrating an example of the multifunction peripheral 100.

In the upper part of the multifunction peripheral 100 of this embodiment, there is disposed an image reading device 1 (corresponding to an input unit), which includes a document feeder unit 1a, and an image reader unit 1b. In addition, in the front upper part of the multifunction peripheral 100 (at the position shown by a broken line in FIG. 1), there is disposed an operation panel 2 that receives various settings for jobs such as document reading, copying, and transmission, and receives settings for a width compaction process. In addition, in the main body of the multifunction peripheral 100, there is disposed a printing unit 3 (corresponding to an output unit), which includes a paper feed unit 3a, a conveying unit 3b, an image forming unit 3c, and a fixing unit 3d.

First, the document feeder unit 1a consecutively feeds document sheets to be read one by one to a reading position (feed reading contact glass 11) in an automatic manner. In addition, the document feeder unit 1a is attached to the image reader unit 1b in a vertically openable and closeable manner about a pivot axis on the rear side of the paper plane of FIG. 1, and functions as a cover for pressing contact glasses of the image reader unit 1b from above.

The fed document sheet passes on the upper surface of the feed reading contact glass 11 disposed on the upper surface of the image reader unit 1b. The image reader unit 1b reads the document sheet passing on the feed reading contact glass 11. As illustrated in FIG. 1, the image reader unit 1b also includes a place reading contact glass 12. The image reader unit 1b can also read a document (e.g. a book) placed face down on the reading contact glass 12 after lifting up the document feeder unit 1a. The image reader unit 1b reads the fed document sheet or the placed document so as to generate image data.

As illustrated in FIG. 1 by the broken line, the operation panel 2 is disposed in the front upper part of the multifunction peripheral 100 (in the front surface of the image reader unit 1b). Further, the operation panel 2 includes a display unit 21 (e.g., a liquid crystal display panel) and a touch panel unit 22 disposed on the display unit 21. The display unit 21 displays a status of the multifunction peripheral 100. In addition, the display unit 21 displays a setting screen including software keys (buttons) for setting functions of a job to be executed. A touched position and a software key (button) displayed at the touched position are recognized based on an output of the touch panel unit 22. In addition, a ten-key unit 23 for inputting numbers and hardware keys such as a start key 24 for instructing to start execution of a job are also provided to the operation panel 2. In this way, the operation panel 2 receives input for setting by the software key or the hardware key.

The paper feed unit 3a sends out the stored paper sheets one by one when printing is performed. The conveying unit 3b forms a path for conveying the paper sheet in the multifunction peripheral 100. The image forming unit 3c forms an image (toner image) based on output data (data after image processing by an image processing unit 6 described later) and transfers the toner image to the conveyed paper sheet. The fixing unit 3d fixes the toner image transferred to the paper sheet. The paper sheet after toner fixing is discharged to the outside of the apparatus.

(Hardware Structure of Multifunction Peripheral 100)

Figure 2:
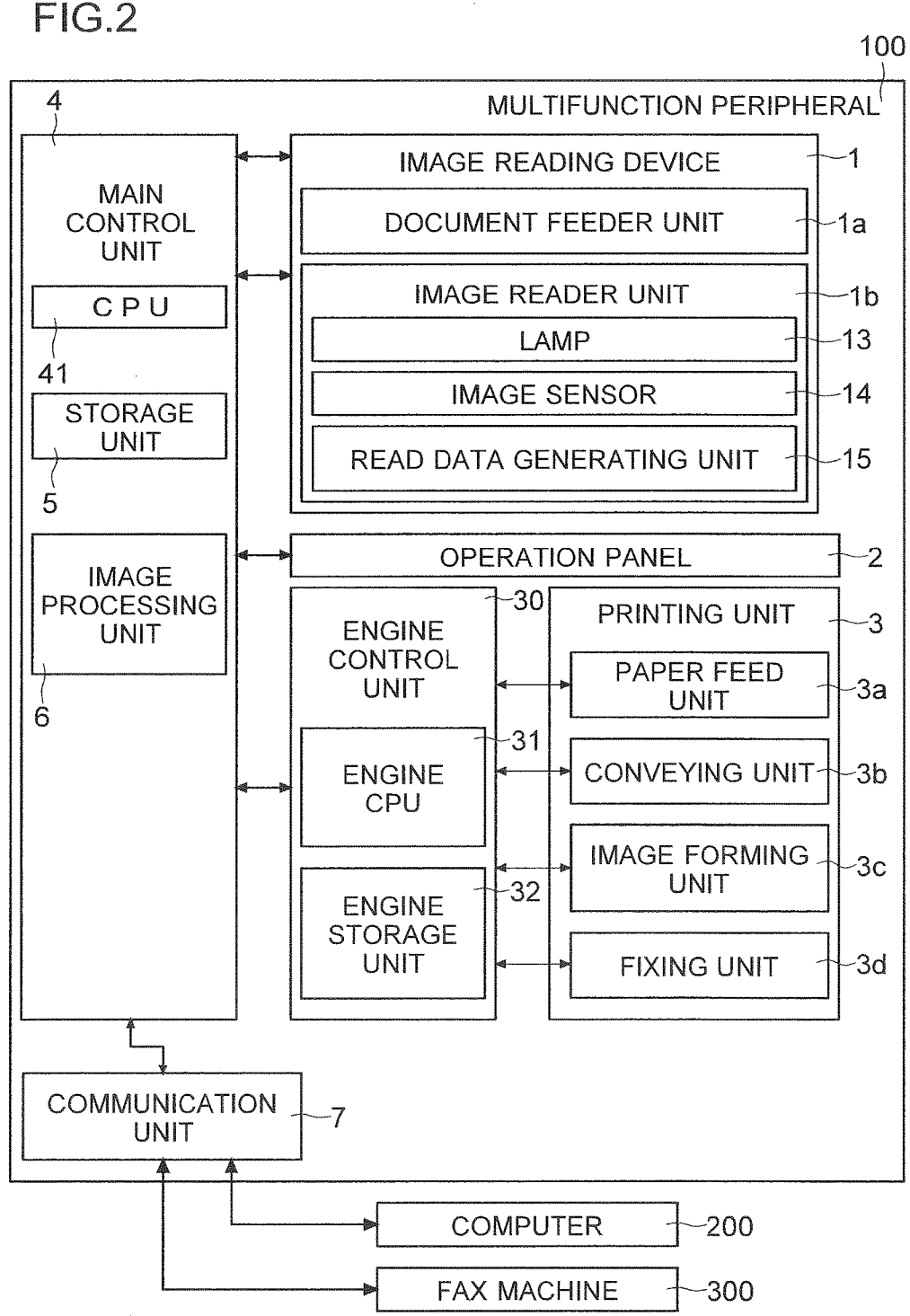
FIG. 2 is a block diagram illustrating an example of a hardware structure of the multifunction peripheral.

Next, with reference to FIG. 2, an example of a hardware structure of the multifunction peripheral 100 according to the embodiment is described. FIG. 2 is a block diagram illustrating an example of a hardware structure of the multifunction peripheral 100.

First, a main control unit 4 that takes charge of operation control of the multifunction peripheral 100 is disposed inside the main body of the multifunction peripheral 100. The main control unit 4 is a circuit board. For example, the main control unit 4 includes a CPU 41 as a unit for performing control. The main control unit 4 controls the entire of the multifunction peripheral 100. For example, the main control unit 4 has functions of performing entire control, communication control, and image processing.

The main control unit 4 includes a storage unit 5. The storage unit 5 stores programs and data for controlling the multifunction peripheral 100, and image data. The storage unit 5 is a combination of a volatile storage device such as a RAM and a nonvolatile storage device such as a ROM, an HDD, or a flash ROM. The CPU 41 performs a calculation process, and transmission and reception of control signals, based on programs and data stored in the storage unit 5, so as to control the multifunction peripheral 100.

In addition, the image processing unit 6 is disposed in the main control unit 4. The image processing unit 6 performs various image processings on the image data for copying, printing, transmitting, and storing the image data in a nonvolatile manner. The image processing unit 6 includes an ASIC and a memory for image processing, and can perform various image processings such as density conversion, scaling, rotation, compression and expansion, and data format conversion. The image processing unit 6 can also perform the width compaction process for deleting a vacant field part (that will be described later in detail). In addition, the image processing unit 6 can also perform other known image processings.

In addition, the multifunction peripheral 100 includes an engine control unit 30. The engine control unit 30 controls ON/OFF of motors for forming an image and conveying the paper sheet. Further, the engine control unit 30 rotates various rotating members for forming an image and conveying the paper sheet. The engine control unit 30 is connected to the main control unit 4 in a communicable manner. The engine control unit 30 controls operation of the printing unit 3 (the paper feed unit 3a, the conveying unit 3b, the image forming unit 3c, and the fixing unit 3d) based on an instruction from the main control unit 4. For example, the engine control unit 30 includes an engine CPU 31 as a processor. In addition, the engine control unit 30 includes an engine storage unit 32 that stores programs and data for controlling objects to be controlled.

In addition, the main control unit 4 is connected to the document feeder unit 1a and the image reader unit 1b in a communicable manner. The main control unit 4 controls the document feeder unit 1a and the image reader unit 1b to read document and to generate image data.

The image reader unit 1b includes a lamp 13 that illuminates the document, an image sensor 14 that reads the document based on reflection light, a read data generating unit 15 that generates image data based on a result of reading the document (analog data) output from the image sensor 14, and performs distortion correction of the image data such as gamma correction and shading correction. The image data generated by the read data generating unit 15 is temporarily stored in the storage unit 5.

The main control unit 4 is connected to the operation panel 2 in a communicable manner. In this way, contents of setting and input performed with the operation panel 2 are transmitted to the main control unit 4. The main control unit 4 instructs the individual units included in the multifunction peripheral 100 so that the units operate in accordance with the contents of setting.

Further, the main control unit 4 is connected to a communication unit 7 (corresponding to the input unit and the output unit). The communication unit 7 communicates with a computer 200 (a PC or a server) or a fax machine 300 via a network, cable, or a communication network. In this way, the multifunction peripheral 100 can receive image data or the like from the computer 200 so as to print (as a print job). In addition, it can transmit the image data generated by the image reader unit 1b to the computer 200 or the external fax machine 300 (as a transmission job).

(Input Unit of Image Data and Output Unit of Image Data After Image Processing)

Next, with reference to FIG. 2, the input unit of the image data and the output unit of the image data after image processing are described.

The image reading device 1 that reads a set document so as to generate the image data is disposed in the multifunction peripheral 100, as the input unit for inputting image data for performing a job. A copy job and the transmission job are executed based on the image data obtained by reading with the image reading device 1.

In addition, the communication unit 7 for receiving print data from the computer 200 is disposed in the multifunction peripheral 100, as the input unit. The print data includes image data and set information concerning printing. The print job (a job using the multifunction peripheral 100 as a printer) is executed based on the image data from the computer 200. Note that, when the communication unit 7 is not connected to the network and cannot communicate with the computer 200, only the image reading device 1 is the input unit.

The image data obtained by reading the document or the image data from the computer 200 is temporarily stored in the storage unit 5. Then, the image processing unit 6 performs image processing on the image data stored in the storage unit 5 in accordance with the setting about the job performed by the operation panel 2 or the computer 200. The image processing unit 6 can delete a vacant field so as to perform the width compaction process for reducing a width in accordance with setting. Finally, the image processing unit 6 generates the output data (image data used for outputting by the output unit).

The multifunction peripheral 100 includes the printing unit 3 that performs printing based on the output data as the output unit that performs a job based on the output data. When performing the copy job or the print job, the printing unit 3 forms a toner image based on the output data and performs printing. In addition, the communication unit 7 functions as the output unit that performs transmission based on the output data. In addition, destinations of the output data include the storage unit 5 that stores the output data in a nonvolatile manner. The output data stored in the storage unit 5 can be reused when performing printing or transmission.

(Vertical Width Compaction Process)

Figure 3:
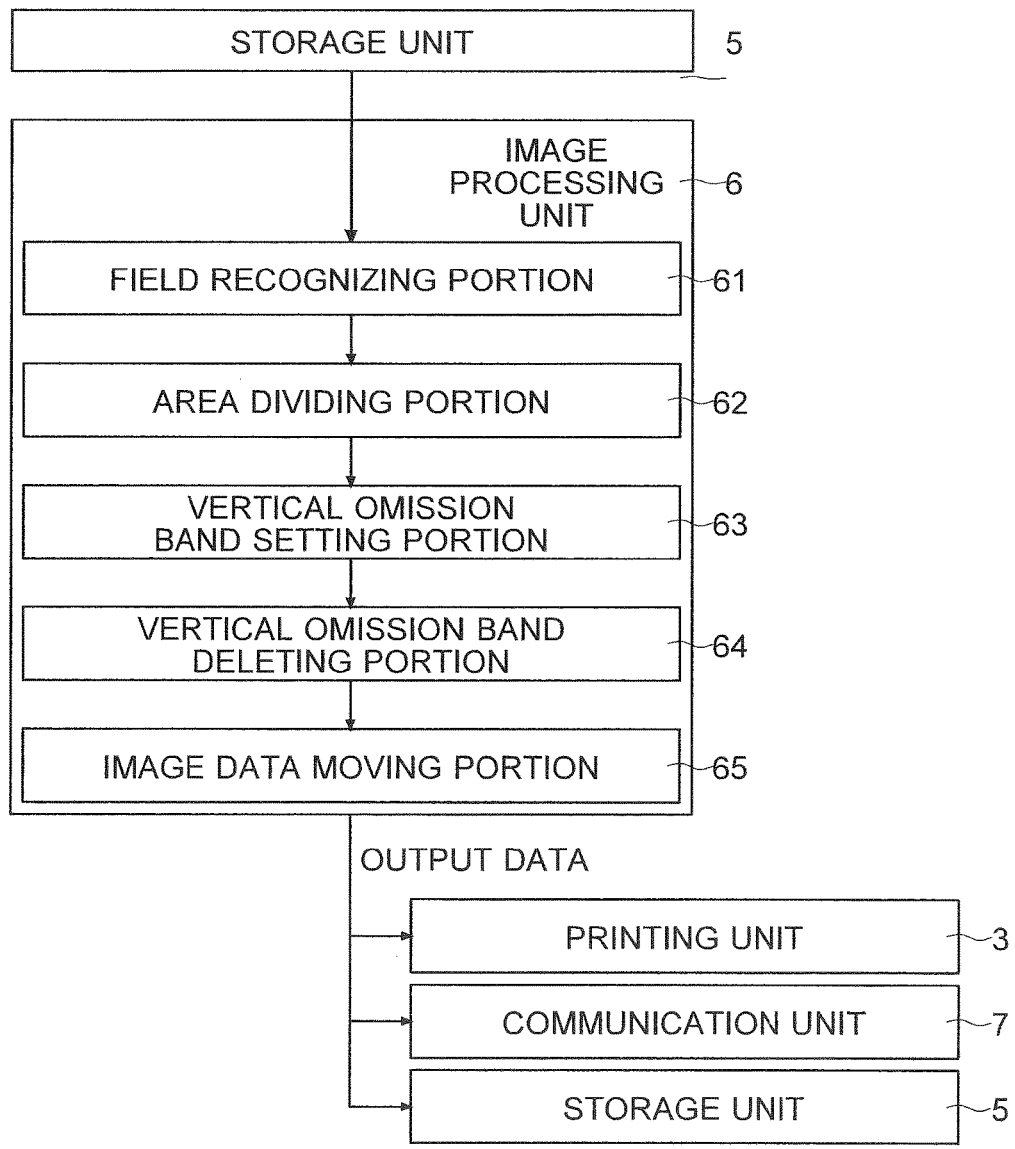
FIG. 3 is a diagram illustrating an example of an image processing unit.
Figure 4:
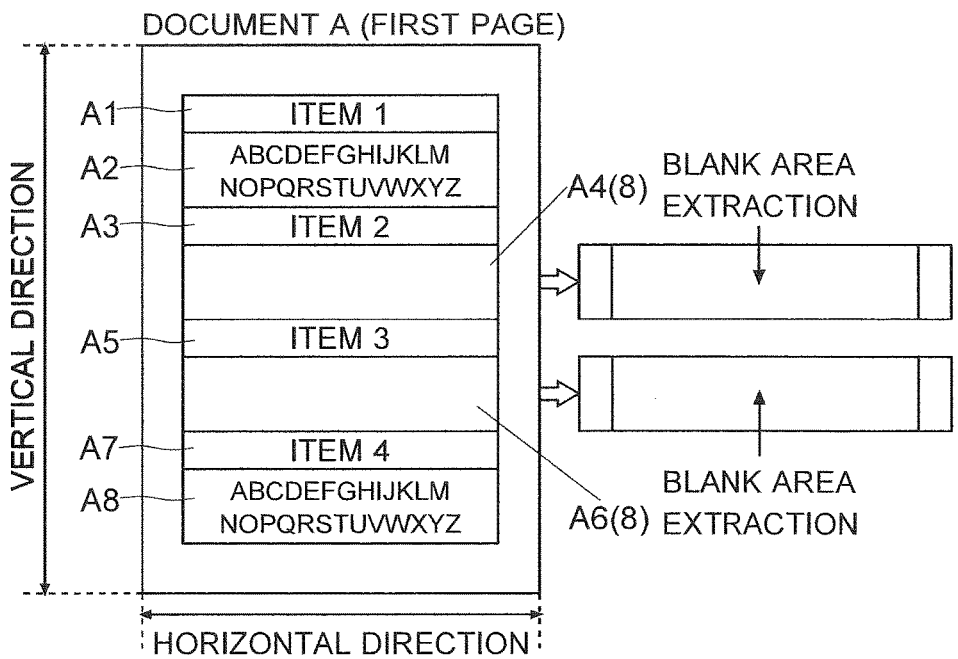
FIG. 4 is a diagram illustrating an example of vertical width compaction candidate field determination and vertical omission band setting.
Figure 5:
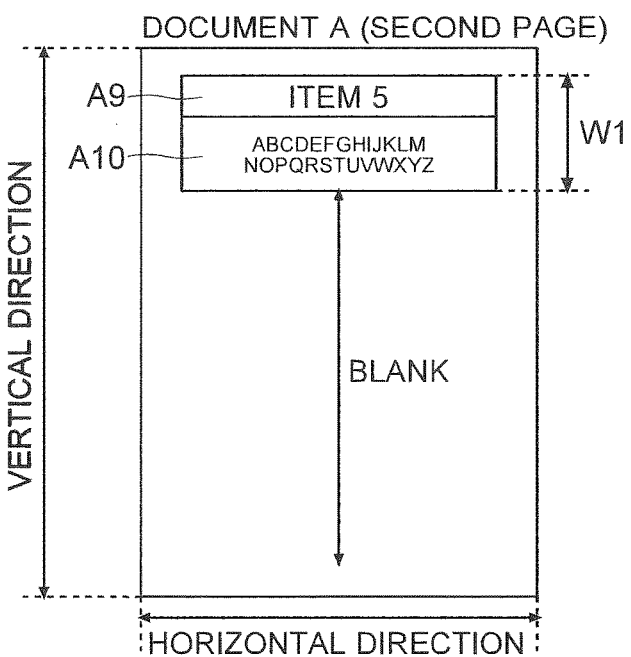
FIG. 5 is a diagram illustrating an example of a blank in the last page.
Figure 6:
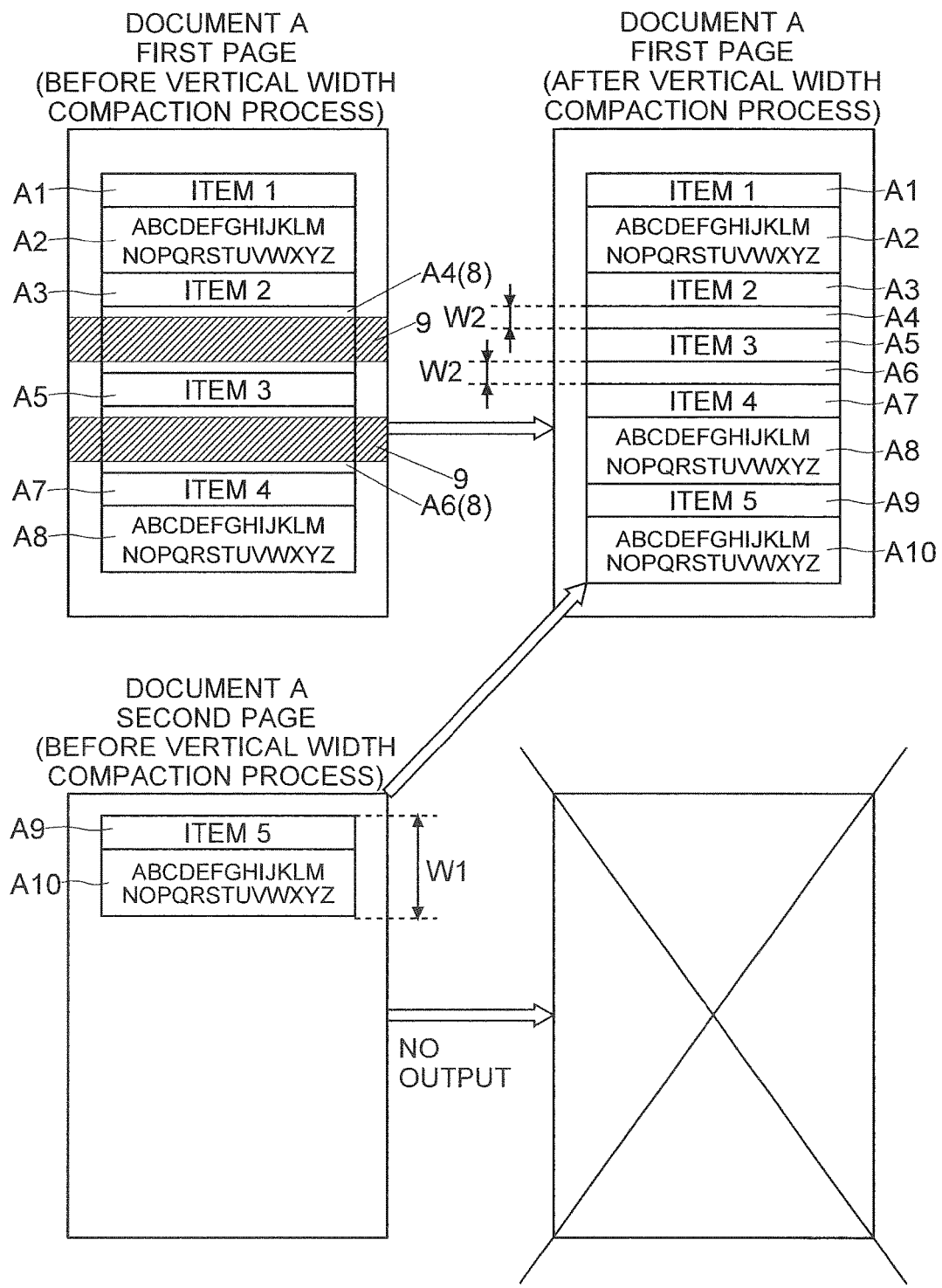
FIG. 6 is a diagram illustrating an example of before and after a vertical width compaction process.
Figure 8:
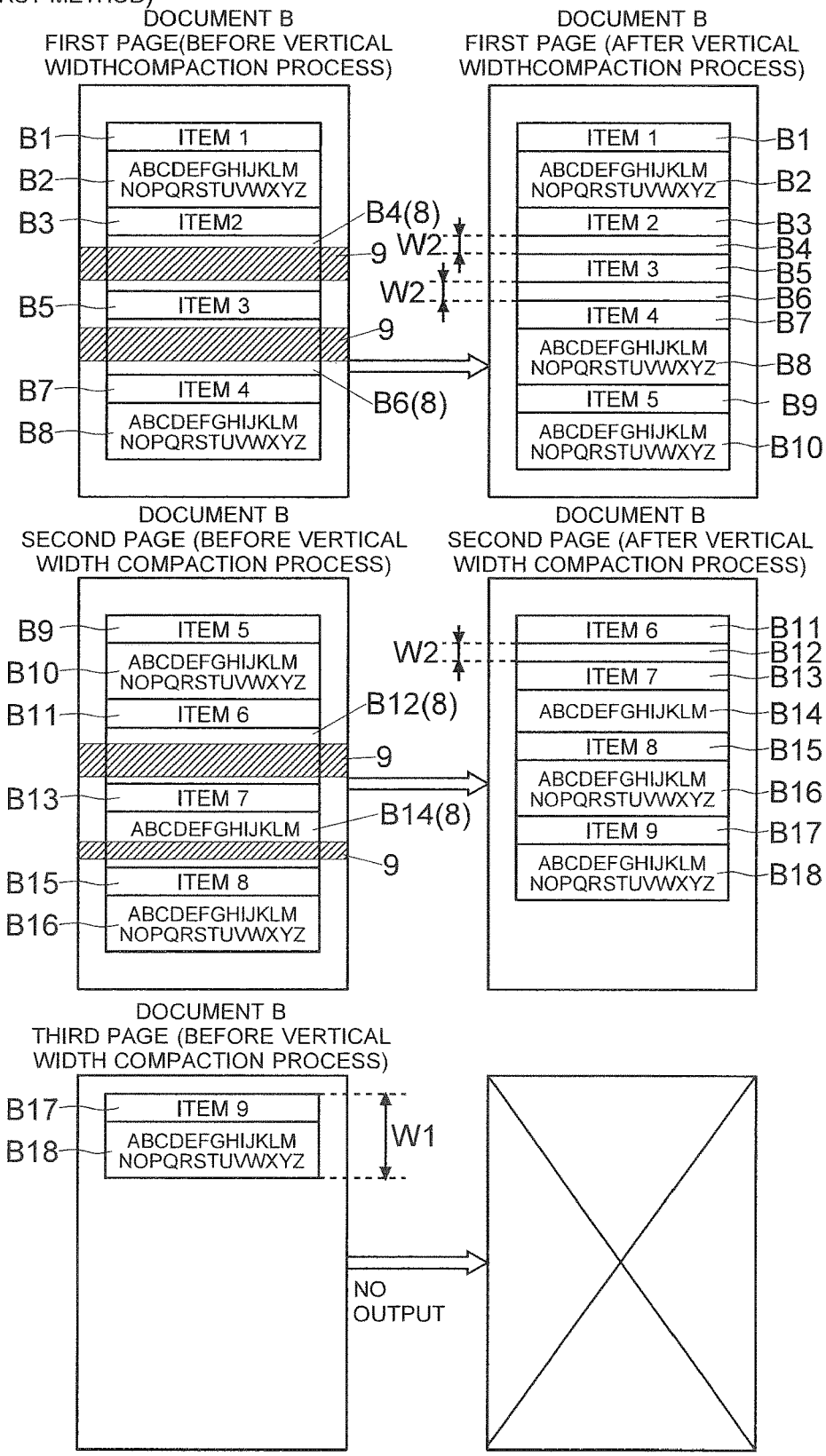
FIG. 8 is a diagram illustrating an example of a certain method of the vertical width compaction process.
Figure 9:
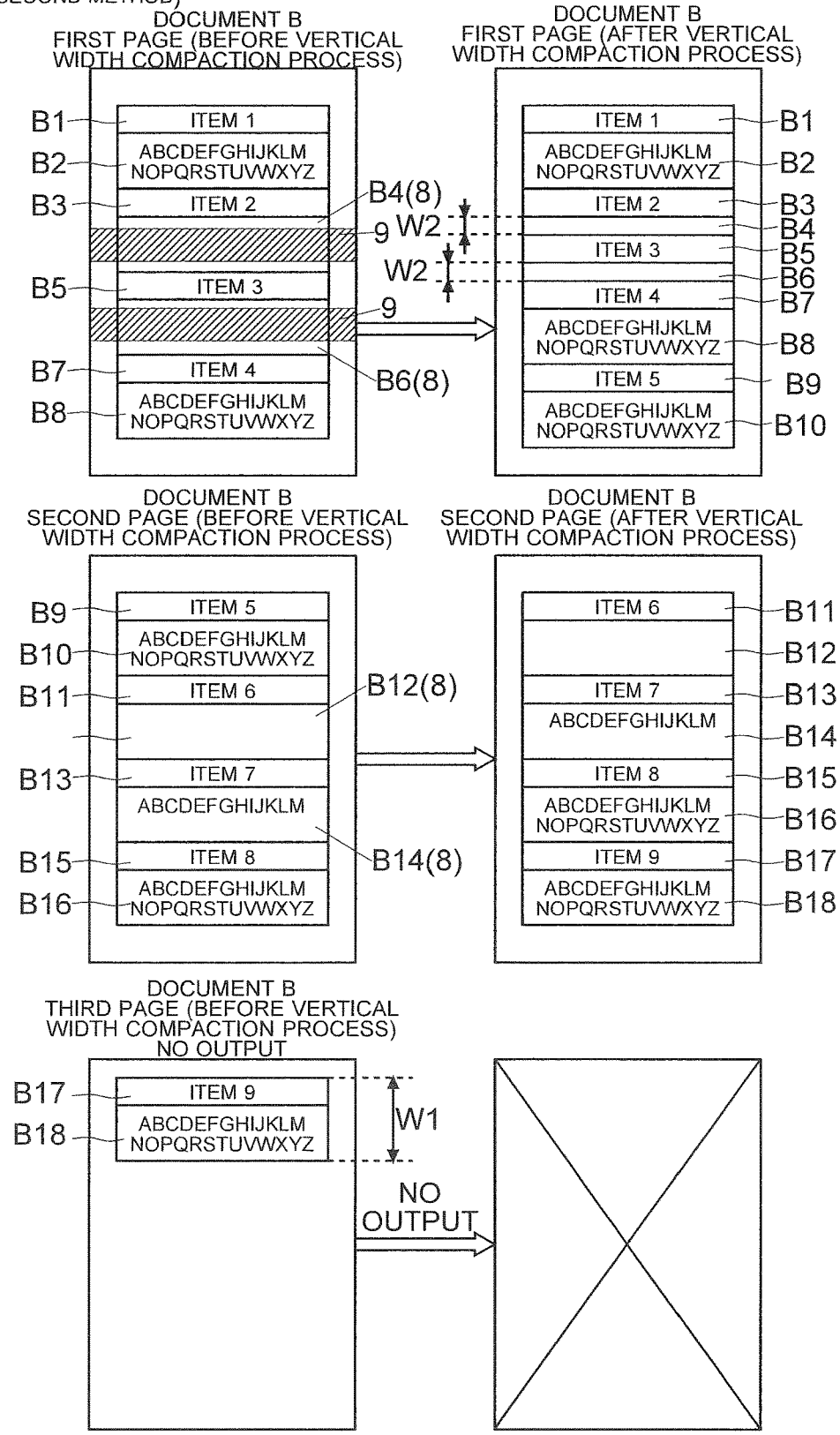
FIG. 9 is a diagram illustrating an example of another method of the vertical width compaction process.
Figure 10:
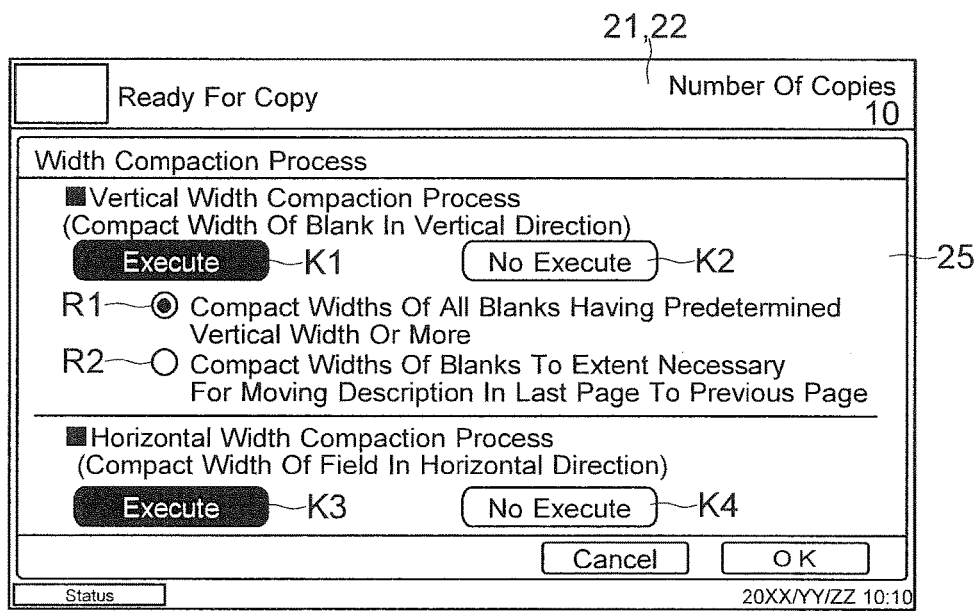
FIG. 10 is a diagram illustrating an example of a width compaction process setting screen.

Next, with reference to FIGS. 3 to 10, a vertical width compaction process in the multifunction peripheral 100 according to this embodiment is described. FIG. 3 is a diagram illustrating an example of the image processing unit 6. FIG. 4 is a diagram illustrating an example of determination of a vertical width compaction candidate field 8 and setting of a vertical omission band 9. FIG. 5 is a diagram illustrating an example of a blank in the last page. FIG. 6 is a diagram illustrating an example of before and after the vertical width compaction process. FIG. 7 is a diagram illustrating an example of setting a first reference value corresponding to the number of total pages of the image data. FIG. 8 is a diagram illustrating an example of a certain method of the vertical width compaction process. FIG. 9 is a diagram illustrating an example of another method of the vertical width compaction process. FIG. 10 is a diagram illustrating an example of a width compact process setting screen 25.

The image processing unit 6 can perform the vertical width compaction process including finding a field having a blank of a predetermined width or more in the vertical direction in the page, and deleting a band area in a horizontal direction (a bunch of horizontal lines) including a part of the field without information such as characters, figures, and symbols.

Specifically, as the vertical width compaction process, the image processing unit 6 recognizes fields enclosed by borders in each page of the image data. In addition, the image processing unit 6 determines whether or not each of the fields is the vertical width compaction candidate field 8 that includes a blank of a predetermined width or more in the vertical direction of the page. In addition, the image processing unit 6 sets the vertical omission band 9, which is a band area from the left end to the right end of the page overlapping an area in the vertical direction of the determined vertical width compaction candidate field 8. The image processing unit 6 sets the vertical omission band 9 so as to delete the blank and a part of the borders (vertical lines) of the vertical width compaction candidate field 8 but not to delete information such as characters, figures, and symbols. In addition, the image processing unit 6 deletes the vertical omission band 9 in the image data, and shifts and compacts image data below the vertical omission band 9 in the upward direction.

As illustrated in FIG. 3, the image processing unit 6 includes a field recognizing portion 61, an area dividing portion 62, a vertical omission band setting portion 63, a vertical omission band deleting portion 64, and an image data moving portion 65. The field recognizing portion 61, the area dividing portion 62, the vertical omission band setting portion 63, the vertical omission band deleting portion 64, and the image data moving portion 65 may be disposed as an image processing circuit (hardware) or may be functionally realized by an algorithm circuit, software, and a memory in the image processing unit 6.

The field recognizing portion 61 recognizes the field enclosed by borders. The field recognizing portion 61 extracts straight lines included in the image data. For example, the field recognizing portion 61 performs image processing such as Hough transform processing for extracting straight lines on each page of the image data so as to extract lines (borders). Further, the field recognizing portion 61 recognizes an area closed by the borders (a part enclosed by the border) as a field. For example, the field recognizing portion 61 recognizes an area enclosed by four different borders (e.g. two vertical straight lines and two horizontal straight lines). Specifically, in a document illustrated in FIGS. 4 and 5, the field recognizing portion 61 recognizes fields A1 to A10 by regarding rectangular areas as fields.

The area dividing portion 62 determines whether or not each of the fields is the vertical width compaction candidate field 8, which is a blank from the left end to the right end of the field and includes a blank of a predetermined width or more in the vertical direction of the page.

For example, the area dividing portion 62 extracts the inside blank area in the field (determination target area). In other words, the area dividing portion 62 detects a low density area having a black pixel density at a threshold value or less in the image data of the document. First, the area dividing portion 62 performs binarization processing on pixels inside the field. Further, the area dividing portion 62 discriminates a row inside the field having the number of black pixels at a threshold value or more as a high density row from a row inside the field having the number of black pixels less than the threshold value as a low density row, by line unit in the row direction (horizontal direction) of the page. Further, the area dividing portion 62 extracts a bunch of continuous low density rows having a predetermined width or more as the blank area. Note that the area dividing portion 62 recognizes (a bunch of) high density rows having the number of black pixels at the threshold value or more as an area including a character string or a figure. Further, the area dividing portion 62 determines a field from which the blank area is extracted as the vertical width compaction candidate field 8. Here, the predetermined width can be appropriately determined. In this example, the predetermined width is approximately 1 to 4 cm, more preferably 2 to 3 cm. The area dividing portion 62 extracts the bunch of low density rows in the field having a width in the vertical direction at 2 cm or more as the blank area.

Note that the area dividing portion 62 may extract a blank area of a predetermined width or more in the field based on other known method. In addition, the area dividing portion 62 may recognize a field in which a character or a symbol is not detected after performing character recognition processing on the area inside the field, as the vertical width compaction candidate field 8.

Specifically, in the document A illustrated in FIGS. 4 and 5, the area dividing portion 62 recognize the fields A4 and A6 as the vertical width compaction candidate field 8. On the other hand, the area dividing portion 62 does not determine the fields A1 to A3, A5, A7 to A10 including characters and texts as the vertical width compaction candidate field 8.

The vertical omission band setting portion 63 sets the vertical omission band 9, which is a band area from the left end to the right end of the page overlapping the area of the determined vertical width compaction candidate field 8 (an area in the vertical direction). In this case, the vertical omission band setting portion 63 sets the vertical omission band 9 to include the blank in the vertical width compaction candidate field 8 and a part of the borders of the vertical width compaction candidate field 8, but not to include information such as characters, figures, and symbols.

Here, when setting the vertical omission band 9, the vertical omission band setting portion 63 does not delete the entire vertical width compaction candidate field 8. In other words, the vertical omission band setting portion 63 does not set the vertical omission band 9 to cover the entire vertical width compaction candidate field 8. The vertical omission band setting portion 63 sets the vertical omission band 9 so that the vertical width of the vertical width compaction candidate field 8 after width compaction becomes a predetermined reserved width W2 or becomes the reserved width W2 or more (see a diagram of the page after the vertical width compaction process in FIG. 6).

Further, the vertical omission band deleting portion 64 deletes the set vertical omission band 9. Further, the image data moving portion 65 moves (shifts) and compacts the image data below the vertical omission band 9 in the upward direction in parallel. As a result, as illustrated in FIG. 6, the vacant fields A4 and A6 are folded among the fields A1 to A10 included in the document A. Further, the number of pages of the image data is changed from two before the vertical width compaction process to one after the vertical width compaction process.

Here, when much information and a small blank part are included in the last page of the image data, it is not necessary to forcibly reduce the number of pages. In addition, even if the vertical width compaction process is performed, the number of pages may not be reduced.

Accordingly, the image processing unit 6 of this embodiment performs the vertical width compaction process only in the case where a large blank is in the last page of the image data. Specifically, the image processing unit 6 determines a last page description width W1 that is a width in the vertical direction from the upper end to the lower end of information described in the last page of the image data (see FIG. 5). Note that it is possible to perform the vertical width compaction process without checking the last page description width W1.

For example, the area dividing portion 62 of the image processing unit 6 performs the binarization processing on the entire last page. Further, the area dividing portion 62 extracts the high density rows having the number of black pixels at a threshold value or more (horizontal lines having the number of black pixels at the threshold value or more). Further, the area dividing portion 62 determines a width (the number of lines) from the uppermost high density row to the lowermost high density row in the last page as the last page description width W1. Note that the image processing unit 6 may determine the last page description width W1 not by the area division but by other method.

Further, the image processing unit 6 performs the vertical width compaction process when the last page description width W1 is a predetermined first reference value or less. Here, the first reference value can be appropriately determined. In the multifunction peripheral 100 of this embodiment, the first reference value is set to approximately 20% of a page length in the vertical direction.

Further, as the number of pages of the image data is larger, the number of vacant fields that can be folded by the vertical width compaction process becomes larger so that a width compaction amount can be larger. Accordingly, as illustrated in FIG. 7, the image processing unit 6 may set the first reference value to a larger value as the number of total pages of the image data of one job is larger, and may set the first reference value to a smaller value as the number of total pages of the image data of one job is smaller.

Specifically, FIG. 7 illustrates an example where the threshold value (first reference value) of the last page description width W1 for determining whether or not to perform the vertical width compaction process is set to a larger value as the number of total pages of the image data is larger. FIG. 7 illustrates an example where the first reference value is increased from W1 to W2 to W3 to W4 . . . to Wn along with an increase of the number of pages. Note that Wn is an upper limit value.

Note that in order to determine the last page description width W1, it is necessary that data of all pages of the image data are completed. For this reason, when determining the last page description width W1 so as to perform the vertical width compaction process, in a job based on the image data obtained by reading a document, the job is started after all pages of the document are read so that image data of the all pages are temporarily stored in the storage unit 5. In addition, in the print job or the transmission job based on image data received from the computer 200, the job is started after image data of all pages are received and temporarily stored in the storage unit 5.

Here, in the multifunction peripheral 100 of this embodiment, two vertical width compaction process methods are prepared. A first method is a method of performing the width compaction process on all the vacant fields on which the width compaction can be performed in the vertical direction. A second method is a method of performing the width compaction process on not all the vacant fields on which the width compaction can be performed in the vertical direction, but to an extent in which contents of the last page can be moved to the page before the last page.

(First Method)

First, the vertical width compaction process in the first method is described with reference to FIG. 8. FIG. 8 illuminates an example of image data of a document B. Image data of the document B has total three pages. Further, there are 18 fields, i.e., fields B1 to B18.

The image processing unit 6 recognizes areas enclosed by borders in the image data of the document B and recognizes that there are 18 fields. Further, the image processing unit 6 determines whether or not each of the 18 fields is the vertical width compaction candidate field 8 that includes a predetermined blank. The predetermined blank is a blank from the left end to the right end of the field, and is a blank of a predetermined width or more in the vertical direction of the page. As a result, the image processing unit 6 determines the fields B4, B6, B12, and B14 in the document B to be the vertical width compaction candidate fields 8.

The field B14 includes a character string. However, it includes a blank from the left end to the right end in the vertical width compaction candidate field 8, which is a blank of a predetermined width or more. Therefore, in this description, the field B14 is also determined to be the vertical width compaction candidate field 8. In this way, even if there are characters, symbols, or figures in a part of the field, when the area dividing portion 62 can extract a predetermined blank area, the field may be recognized to be the vertical width compaction candidate field 8. Note that it is possible to recognize only a complete vacant field (only a field without a high density row) to be the vertical width compaction candidate field 8.

Next, the image processing unit 6 sets the vertical omission bands 9 in the fields B4, B6, B12, and B14. In this case, the vertical omission band 9 is set in each vertical omission candidate field so that at least the predetermined reserved width W2 in the vertical direction is left. In FIG. 8 illustrating the pages before the vertical width compaction process, an example of the vertical omission bands 9 set by the image processing unit 6 is shown with half-tone dot meshing. Note that when there is information such as characters, figures, or symbols in a part of the field like the field B14, the image processing unit 6 sets the vertical omission band 9 so as to include a blank in the vertical width compaction candidate field 8 and a part of the border in the vertical width compaction candidate field 8, but not to include the information such as characters, figures, or symbols. The image processing unit 6 sets the vertical omission band 9 so as to overlap the extracted blank area and not to include a high density row.

The image processing unit 6 deletes the set vertical omission bands 9. In the example of FIG. 8, a bunch of horizontal lines (strip-like data) is deleted at each of positions of the fields B4, B6, B12, and B14. Further, the image processing unit 6 compacts the remaining image data (pixels) in the upward direction so as to fill the deleted part that is image data below the vertical omission band 9. As a result, as illustrated in the diagram of each page after the vertical width compaction process in FIG. 8, contents of the last page before the process are moved into the page before the last page. As a result, the number of pages of the document is decreased.

(Second Method)

Next, the vertical width compaction process in the second method is described with reference to FIG. 9. Similarly to FIG. 8, FIG. 9 illustrates an example of the image data of the document B.

In the case of the second method, the width compaction in the vertical direction is performed to an extent necessary for moving the contents (information) of the last page to the page just before the last page. Therefore, the image processing unit 6 first determines the last page description width W1. Next, the image processing unit 6 recognizes fields included in the pages of the image data. Further, the image processing unit 6 determines whether or not each of the recognized fields is the vertical width compaction candidate field 8, and sets the vertical omission bands 9 when it is the vertical width compaction candidate field 8. Further, the image processing unit 6 deletes the set vertical omission bands 9 in order from the top side (or from the bottom side) of the image data. Note that it is possible to determine the order for deleting the vertical omission bands 9 at random regardless of an order of pages or a positional relationship in the vertical direction in the page. Further, every time when one vertical omission band 9 is deleted, the image processing unit 6 checks whether or not the sum of the compacted width in the vertical direction has become the last page description width W1 or more.

When the sum of the compacted width in the vertical direction becomes the last page description width W1 or more, the image processing unit 6 finishes deletion of the vertical omission band 9 and moving of the image data. When the sum of the compacted width in the vertical direction is smaller than the last page description width W1 after deleting a certain vertical omission band 9, the image processing unit 6 deletes the next vertical omission band 9.

Unlike the first method, in the vertical width compaction process of the second method, all the vacant fields (vertical omission bands 9) are not always deleted. The example of FIG. 9 shows that the vertical width compaction process is finished when width compaction of the fields B4 and B6 is performed, because the width compaction for the last page description width W1 has been achieved. Further, the width compaction in the vertical direction of the fields B12 and B14 is not performed. However, contents of the last page are moved to the page just before the last page, and the number of pages of the document B is reduced by one.

Here, the multifunction peripheral 100 of this embodiment can set one of the first method and the second method to perform the vertical width compaction process. When an operation of calling the width compact process setting screen 25 is performed with the operation panel 2, the display unit 21 displays the width compact process setting screen 25 as illustrated in FIG. 10.

In the width compact process setting screen 25 illustrated in FIG. 10, it can be set first whether or not to perform the vertical width compaction process. Concerning the vertical width compaction process, the width compact process setting screen 25 is provided with an execution key K1 and a non-execution key K2. The operation panel 2 (touch panel unit) receives a touch operation to the execution key K1 as an instruction to perform the vertical width compaction process. In addition, the operation panel 2 (touch panel unit) receives a touch operation to the non-execution key K2 as an instruction not to perform the vertical width compaction process.

In the width compact process setting screen 25 illustrated in FIG. 10, it is possible to set whether to perform the vertical width compaction process by the first method or by the second method. For setting the first method or the second method, two radio buttons R1 and R2 are disposed. The operation panel 2 receives the operation to the upper radio button R1 as an input to perform the vertical width compaction process by the first method. The operation panel 2 receives the operation to the lower radio button R2 as an input to perform the vertical width compaction process by the second method.

The operation panel 2 transmits to the main control unit 4 the data indicating the selling whether or not to perform the vertical width compaction process and the setting of the method for the vertical width compaction process. On the basis of the transmitted data, the main control unit 4 recognizes whether or not to perform the vertical width compaction process and recognizes the method for performing the vertical width compaction process. Further, in the setting of performing the vertical width compaction process, the main control unit 4 controls the image processing unit 6 to perform the vertical width compaction process by the selected method.

(Details of Setting Vertical Omission Band 9)

Figure 11:
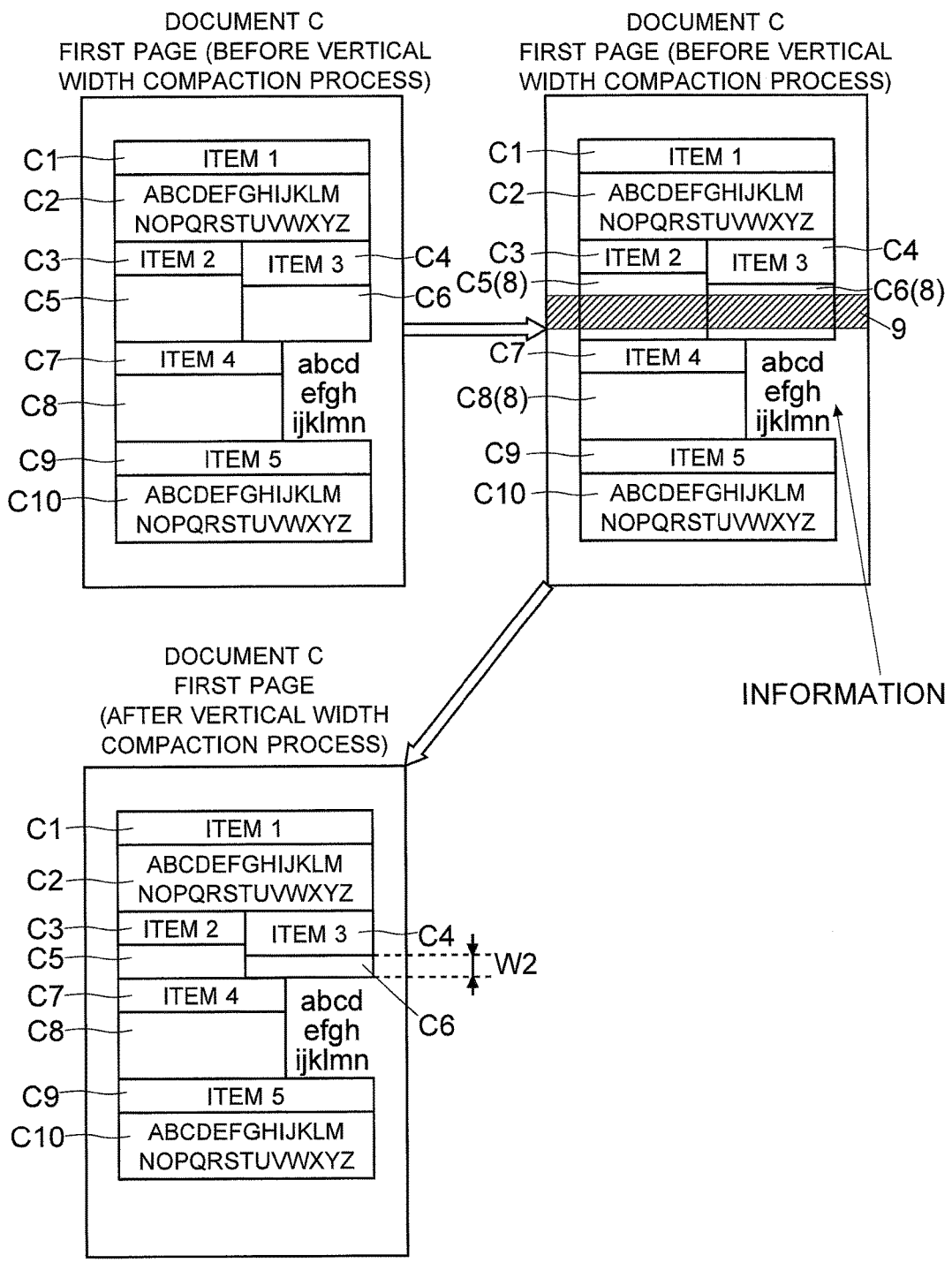
FIG. 11 is an explanatory diagram illustrating details of the vertical omission band setting.

Next, with reference to FIG. 11, details of setting the vertical omission band 9 are described. FIG. 11 is an explanatory diagram illustrating details of setting the vertical omission band 9.

FIG. 11 shows a first page of a document C. Because the vertical width compaction process is performed, the document C has a plurality of pages. However, for convenience of description, FIG. 11 shows only the first page of the document C. Further, as illustrated in FIG. 11, the first page of the document C includes fields C1 to C10.

The image processing unit 6 recognizes the fields in the first page of the document C. Then, the image processing unit 6 recognizes that the first page of the document C includes the fields C1 to C10. Further, the image processing unit 6 determines the field C5, C6, and C8 to be the vertical width compaction candidate fields 8 among the fields C1 to C10.

Here, the vertical omission band setting portion 63 does not set the vertical omission band 9 so as to cover a part of the field C8. This is because there is a character string on the right side of the field C8. When the vertical omission band 9 is set from the left end to the right end of the page so as to include the area of the field C8, the character string (information) is also deleted instead of deleting only the blank in the vertical width compaction candidate field 8 and a part of the borders of the vertical width compaction candidate field 8. In this way, the vertical omission band setting portion 63 sets the vertical omission band 9 so as to delete only the blank in the vertical width compaction candidate field 8 and a part of the borders (vertical lines) of the vertical width compaction candidate field 8 but not to delete information (characters, figures, or symbols).

Specifically, when setting the vertical omission band 9 to the vertical width compaction candidate field 8, the image processing unit 6 performs an area division process on an area from which the vertical width compaction candidate field 8 is excluded. As a result of performing the area division process, when there is a high density row in the area in which the vertical omission band 9 is to be set, from which the vertical width compaction candidate field 8 is excluded, the vertical omission band 9 is not set. As a result, when the finally set vertical omission band 9 is deleted, the information is not deleted.

Next, there is described a case where the vertical width compaction candidate fields 8 are disposed side by side in the horizontal direction of the page. A document may have a plurality of fields arranged in the horizontal direction of the page. When one of the plurality of fields arranged in the horizontal direction of the page is a vacant field while the other field includes information, the width compaction should not be performed on the plurality of fields arranged in the horizontal direction of the page.

Accordingly, when a plurality of fields are arranged in the horizontal direction of the page and all of them are determined to be the vertical width compaction candidate field 8, the image processing unit 6 sets the vertical omission band 9, which is a band area from the left end to the right end of the page so as to cover blanks in all the vertical width compaction candidate field 8 arranged in the horizontal direction (so as to cover all the extracted blank areas).

FIG. 11 is referred to for description. In the first page of the document C illustrated in FIG. 11, fields C5 and C6 are arranged in the horizontal direction. Further, in this description, it is supposed that the fields C5 and C6 are vacant fields having a width larger than a predetermined width in the vertical direction. In this case, the image processing unit 6 determines that the fields C5 and C6 are the vertical width compaction candidate fields 8. The field C5 and the field C6 have different widths in the vertical direction. Accordingly, the image processing unit 6 sets the vertical omission band 9 so as to cover the plurality of blank parts arranged in the horizontal direction. Note that the image processing unit 6 sets the vertical width of the vertical omission band 9 so that the width in the vertical direction after width compaction becomes the reserved width W2 or more in each of the vertical width compaction candidate fields 8 arranged in the horizontal direction (fields C5 and C6).

(Margin Elimination after Vertical Width Compaction Process)

Figure 12:
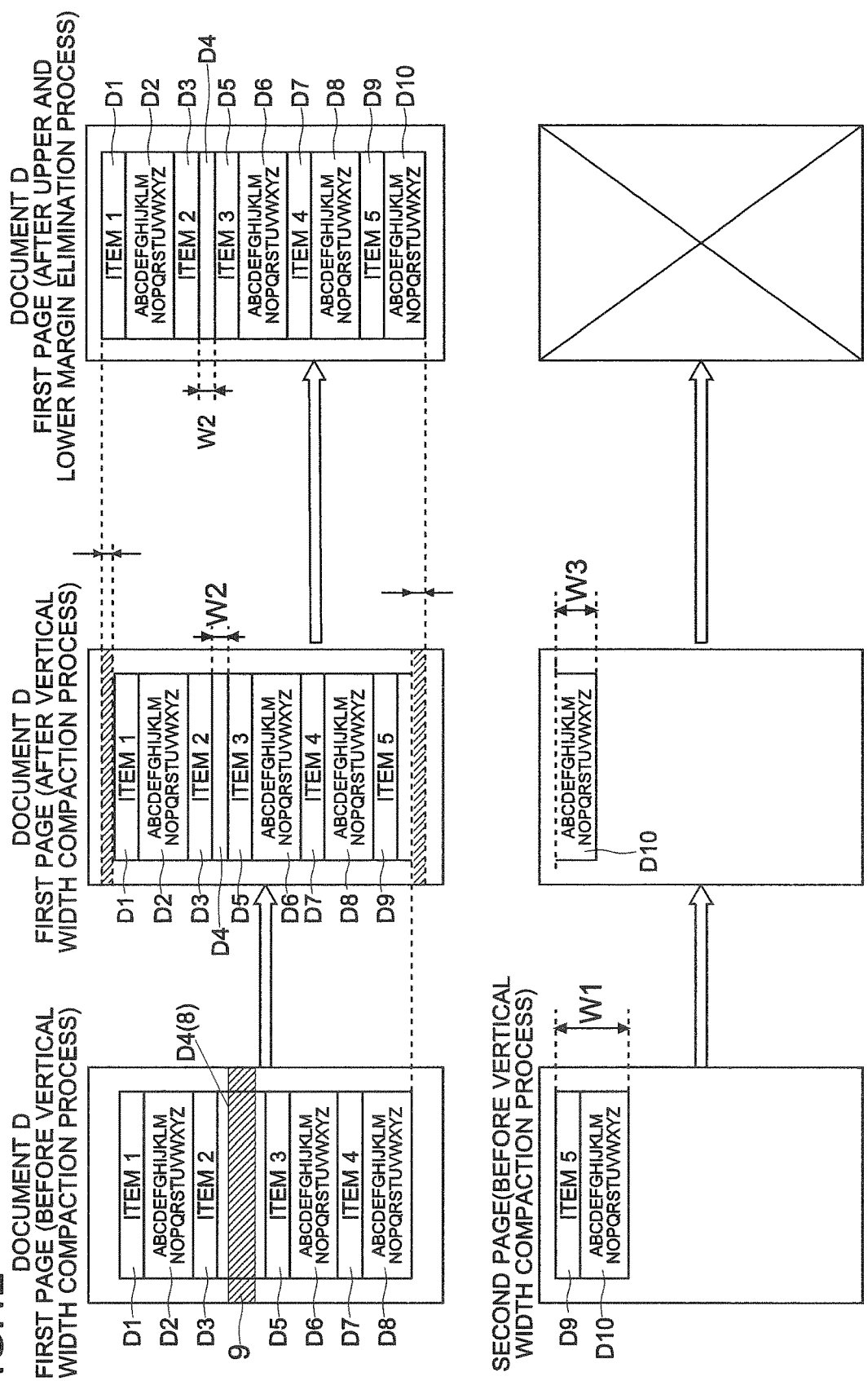
FIG. 12 is an explanatory diagram illustrating margin elimination after the vertical width compaction process.

Next, with reference to FIG. 12, margin elimination after the vertical width compaction process is described. FIG. 12 is an explanatory diagram illustrating the margin elimination after the vertical width compaction process.

As described above, the image processing unit 6 of this embodiment performs the vertical width compaction process. However, as a result of performing the vertical width compaction process, contents of the last page may remain a little. For example, there is a case where the width compaction in the vertical direction is not sufficient for moving the contents of the last page to the previous page. In this case, the blank in the last page becomes larger.

In this case, the image processing unit 6 performs an upper and lower margin elimination process in which a width in the vertical direction of upper and lower margins of the page is reduced in one or more pages of the image data so that the number of total pages is reduced by one. Note that it is possible to eliminate one of the upper and lower margins of the page. In addition, it is possible to eliminate the margin of all pages except the last page of the image data. In addition, it is possible to eliminate the margin of only a specific page of the image data.

In order to determine whether or not to perform the margin elimination after the vertical width compaction process, the image processing unit 6 recognizes a remaining width W3 that is a width in the vertical direction from upper end to lower end of information described in the last page of the image data after the vertical width compaction process.

The image processing unit 6 should recognize the remaining width W3 in the same manner as determining the last page description width W1. Specifically, the area dividing portion 62 of the image processing unit 6 performs the binarization processing and a high density row extraction process of rows having the number of black pixels at a threshold value or more on the entire last page of the image data of the vertical width compaction process. Further, the area dividing portion 62 determines the remaining width W3, which is a width (the number of lines) from the uppermost high density row to the lowermost high density row in the last page. Note that the image processing unit 6 may determine the remaining width W3 not by the area division but by other method.

Further, the image processing unit 6 determines to perform the margin elimination process when the remaining width W3 is less than a predetermined second reference value. On the other hand, when the remaining width W3 is the predetermined second reference value or more, the image processing unit 6 determines not to perform the margin elimination process. Here, the second reference value can be appropriately determined. The second reference value may be the same as the first reference value or may be a value smaller than (preferably a half of) the first reference value. In addition, the image processing unit 6 may set the second reference value to a larger value as the number of total pages of the image data of one job is larger, while it may set the second reference value to a smaller value as the number of total pages of the image data of one job is smaller.

Further, the image processing unit 6 eliminates upper and lower margins of one or more pages of the image data (except the last page after the vertical width compaction process), so as to reduce the number of total pages by one.

In this embodiment, the image processing unit 6 performs the margin elimination process on all pages except the last page of the image data after the vertical width compaction process. In addition, the image processing unit 6 eliminates both the upper and lower margins of the pages on which the margin elimination process is performed. This is because an elimination width per one place at which the margin is eliminated becomes minimum.

The image processing unit 6 determines a first calculated value by dividing the remaining width W3 by the number of total pages after the vertical width compaction process minus one. In other words, the image processing unit 6 determines an amount of margin to be eliminated per page. Next, because the upper and lower margins are eliminated, the image processing unit 6 divides the first calculated value by two so as to determine a second calculated value. In other words, the image processing unit 6 determines the elimination width per one margin.

Further, the image processing unit 6 eliminates margins of all pages except the last page of the image data after the vertical width compaction process. Specifically, the image processing unit 6 reduces both the upper and lower margins of each page by the second calculated value. Note that the image processing unit 6 may reduce the upper and lower margins of each page by the determined second calculated value plus an allowance. Next, the image processing unit 6 moves the position of the image data below the reduced margin upward (toward the head of the page).

Here, this is described specifically with reference to FIG. 12. FIG. 12 shows an example of image data of a document D. The image data of the document D has two pages. In addition, the document D includes fields D1 to D10. The image data of the document D before the vertical width compaction process is shown on the left side of FIG. 12. Further, the state where the width of the field D4 among the fields D1 to D10 is compacted in the vertical direction by the vertical width compaction process is shown in the middle of FIG. 12.

As shown in the middle of FIG. 12, the width compaction is performed only on the field D4 in the vertical width compaction process, and hence a part of the field D10 may remain in the last page (the second page). Accordingly, the image processing unit 6 eliminates the upper and lower margins (band areas as margins from the left end to the right end) of the page except the last page (i.e., the first page in the example of FIG. 12) of the image data after the vertical width compaction process. In FIG. 12, the margins to be eliminated in the document D after the vertical width compaction process is shown by half-tone dot meshing.

The number of total pages of the document D after the vertical width compaction process is two. Further, by performing the margin elimination process, the number of total pages of the document D is reduced to one. As a result, character strings and fields are compacted in one page, and an easy to view document is realized.

(Horizontal Width Compaction Process)

Figure 13:
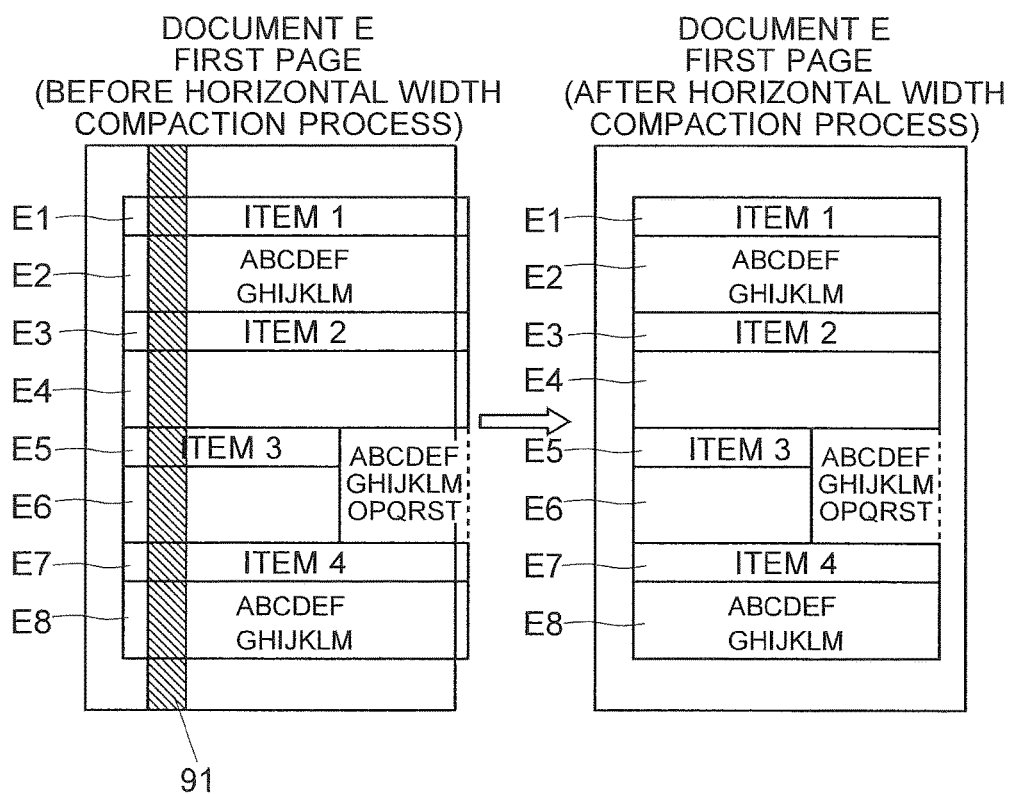
FIG. 13 is an explanatory diagram illustrating a horizontal width compaction process.

Next, with reference to FIG. 13, a horizontal width compaction process is described. FIG. 13 is an explanatory diagram illustrating the horizontal width compaction process.

The image data may overflow in the horizontal direction of the page. In other words, a width in the horizontal direction of the image data may be larger than a size of the page. For example, when a size of the paper sheet designated to be used in printing is smaller than a page size of the image data, the image data overflows in the horizontal direction of the page.

When the overflow in the horizontal direction occurs, the number of printed pages becomes more than that in the case where the size of the paper sheet designated to be used in printing is the same as the page size of the image data. In addition, when the overflow in the horizontal direction occurs, the number of transmission pages becomes more than that in the case where a size designated as the transmission size is the same as the page size of the image data. In this case, when a blank is eliminated without damage to information so that the width of the image data in the horizontal direction can be reduced, the number of total printed pages or the number of transmission pages of the image data can be reduced. The upper left diagram in FIG. 13 shows a state where the right side of the image data overflows.

Accordingly, the image processing unit 6 of the multifunction peripheral 100 of this embodiment performs the horizontal width compaction process when the image data overflows in the horizontal direction with respect to a paper sheet size designated to be used in printing or a size designated as the transmission size, even after multiplying the image data by a scaling ratio set by the operation panel 2 or the computer 200. For example, the image processing unit 6 recognizes fields in one page of the image data and detects a blank area in each field. In addition, when the page has an area outside a field, the image processing unit 6 detects a blank area outside the field.

Here, when extracting a blank area inside a field (determination target area), the area dividing portion 62 first performs the binarization processing on pixels inside the field. Further, the area dividing portion 62 discriminates a column inside the field having the number of black pixels at a threshold value or more as a high density column from a column inside the field having the number of black pixels at the threshold value or less as a low density column, by line unit in the column direction (vertical direction) of the page. Further, the area dividing portion 62 extracts a bunch of continuous low density columns having a predetermined horizontal width or more (a bunch of blank columns in the horizontal direction) as the blank area in the field. Note that the area dividing portion 62 determines the bunch of high density columns having the number of black pixels at a threshold value or more in the field as an area with a character string or a figure.

In addition, when extracting a blank area in an area outside a field, the area dividing portion 62 first performs the binarization processing on pixels outside the field. Further, the area dividing portion 62 discriminates a column outside the field having the number of black pixels at a threshold value or more as a high density column from a column outside the field having the number of black pixels at the threshold value or less as a low density column, by a column direction (vertical direction) unit of the page. Further, the area dividing portion 62 extracts a bunch of continuous low density columns having a predetermined horizontal width or more as the blank area outside the field. Note that the image processing unit 6 may extract the blank area by other known method.

Further, the image processing unit 6 set a horizontal omission band 91, which is a band area from upper end to lower end of the page and is a band area including a blank in at least one field, in which the blank and a part of borders of the field in the horizontal direction are deleted, but information (characters, figures, or symbols) is not deleted. In other words, the image processing unit 6 sets the horizontal omission band 91 to include only the blank area and the borders of the field.

Further, the image processing unit 6 performs a process of deleting the horizontal omission band 91 in the image data, and shifting and compacting a block of the image data on the right or left side of the horizontal omission band 91. Specifically, the image processing unit 6 shifts and compacts the block of the image data on the side overflowing from the page.

Here, FIG. 13 is referred to for specific description. FIG. 13 shows an example of image data of a document E. The image data of the document E has one page. In addition, the document E includes fields E1 to E8. FIG. 13 shows the image data of the document E before the horizontal width compaction process on the left side. The image processing unit 6 recognizes the fields E1 to E8 in the document E. In addition, the image processing unit 6 also recognizes the area outside the field, which is adjacent to the fields E5 and E6. Further, the image processing unit 6 extracts blank areas inside the fields and in the area outside the field. Further, the image processing unit 6 sets the horizontal omission band 91, which is a band area from upper end to lower end of the page and is a band area including a blank in at least one field, in which the blank and a part of borders of the field in the horizontal direction are deleted, but information (characters, figures, or symbols) is not deleted. The half-tone dot meshing area on the document E in FIG. 13 is the horizontal omission band 91 that is set.

Further, the image processing unit 6 deletes the horizontal omission band 91 in the image data of the document E, and shifts and compacts the image data on the right side of the horizontal omission band 91. As a result, as illustrated in FIG. 13 as the diagram on the right side, the width of the document E is compacted in the horizontal direction so that the document E is within one page.

Note that in the width compact process setting screen 25 illustrated in FIG. 10, it can be set first whether or not to perform the horizontal width compaction process. Concerning the horizontal width compaction process, the width compact process setting screen 25 is provided with an execution key K3 and a non-execution key K4. The operation panel 2 (touch panel unit) receives a touch operation to the execution key K3 as an instruction to perform the horizontal width compaction process. In addition, the operation panel 2 (touch panel unit) receives a touch operation to the non-execution key K4 as an instruction not to perform the horizontal width compaction process. When the operation to the execution key K3 is performed, the image processing unit 6 performs the horizontal width compaction process. When the operation to the non-execution key K4 is performed, the image processing unit 6 does not perform the horizontal width compaction process.

In this way, the image forming device (multifunction peripheral 100) of this embodiment includes the input unit (the image reading device 1, the communication unit 7) that inputs image data for executing a job, an image processing unit 6 that performs image processing based on image data input to the input unit so as to generate output data, and the output unit (the printing unit 3, the communication unit 7, the storage unit 5) that performs the job based on the output data. The image processing unit 6 performs the vertical width compaction process, which includes recognizing a field enclosed by borders in a page of the image data, determining whether or not the recognized field is a vertical width compaction candidate field 8 that is a field including a blank from the left end to the right end in the field having a width in the vertical direction at a predetermined width or more, setting a band-like vertical omission band 9 from the left end to the right end of the page overlapping with a range of the determined vertical width compaction candidate field 8 (a range in the vertical direction), setting the vertical omission band 9 so as to include the blank and a part of borders of the vertical width compaction candidate field 8 but not to delete information, deleting the vertical omission band 9 in the image data, and shifting and compacting image data below the vertical omission band 9 in the upward direction.

In this way, when contents (information) of the last page are a little, a space is secured by the width compaction (folding) of vacant fields. In this way, a position of the contents of the last page can be moved to the page before the original last page. Therefore, the number of total pages of the image data can be reduced. In addition, when performing printing, printing of the last page with a large blank can be avoided, and the number of total pages of the printed matter can be reduced without largely changing the entire form or format. In addition, when performing transmission, data quantity of the image data to be transmitted to the other party can be reduced. In this way, waste of paper sheets, power consumption, or storage capacity can be eliminated.

In addition, the image processing unit 6 recognizes the fields in all pages of the image data, determines whether or not the recognized field is the vertical width compaction candidate field 8, sets the vertical omission band 9, and deletes all the set vertical omission bands 9.

In this way, the width compaction of the vacant field parts of the entire image data is performed. Therefore, the number of total pages of the image data can be reduced. In addition, when performing printing based on the image data, the number of total pages of the printed mater can be reduced as much as possible. In addition, data quantity of the image data to be transmitted or stored can be reduced as much as possible.

In addition, the image processing unit 6 determines the last page description width W1, which is a width in the vertical direction from upper end to lower end of the information described in the last page of the image data, and deletes the vertical omission bands 9 one by one in a predetermined order. When the sum of the widths deleted by the vertical omission band 9 in the vertical direction becomes the last page description width W1 or more, the vertical width compaction process is finished.

In this way, the width compaction in the vertical direction is performed to the extent necessary for reducing the number of total pages by one. Therefore, the entire form or format is not largely changed.

In addition, the image processing unit 6 performs the vertical width compaction process when the last page description width W1 is a predetermined first reference value or less, and does not perform the vertical width compaction process when the last page description width W1 is more than the predetermined first reference value.

In this way, it is possible to perform the width compaction in the vertical direction only when the last page description width W1 is a predetermined first reference value or less and there is a large blank in the last page. Here, the first reference value can be appropriately determined. For example, the first reference value is set to 50% or less of the entire vertical width of one page (more preferably, approximately 10 to 20% of the same).

In addition, the image processing unit 6 sets the first reference value to a larger value as the number of total pages of the image data of one job is larger, and sets the first reference value to a smaller value as the number of total pages of the image data of one job is smaller.

As the number of total pages of the image data is larger, the number of vacant fields that can be folded by the vertical width compaction process becomes larger, and the width compaction amount may be larger. In this way, the first reference value can be set in accordance with the number of total pages of the image data.

In addition, the image processing unit 6 determines the remaining width W3, which is a width in the vertical direction from upper end to lower end of the information described in the last page of the image data after the vertical width compaction process. When the remaining width W3 is shorter than the predetermined second reference value, the image processing unit 6 deletes the upper and lower margins of one or more pages in the image data, so as to reduce the number of total pages.

In this way, when the last page of the image data has a little contents and a large blank as a result of performing the vertical width compaction process, widths of the upper and lower margins in the image data are reduced. In this way, the remaining contents in the last page can be moved to the page before the last page. Here, the second reference value can be appropriately determined. The second reference value may be the same as the first reference value or may be a value smaller than the first reference value (e.g. a half thereof).

In addition, the image processing unit 6 sets the vertical omission band 9 so that the vertical width after the width compaction of the vertical width compaction candidate field 8 becomes the predetermined reserved width W2 or more. In this way, the vertical width compaction process can be performed so as to keep the reserved width W2 of vacant field instead of deleting the entire vertical width compaction candidate field 8. Thus, because a part of the field remains instead of deleting the entire vacant field from the page, the form or format is not so largely changed between before and after the vertical width compaction process.

In addition, the image processing unit 6 performs the horizontal width compaction process, which includes recognizing fields in the page of the image data, detecting blank areas in the field and blank areas outside the fields, setting the band-like horizontal omission band 91 from upper end to lower end of the page, including a blank in at least one field, setting the horizontal omission band 91 so as to delete the blank and a part of borders of the field in the horizontal direction but not to delete information, deleting the horizontal omission band 91 in the image data, and shifting to compact the image data on the right or left side of the horizontal omission band 91 in the horizontal direction.

In this way, even when an actual width of the image data of one page in the horizontal direction is large and overflows from the set width, it is possible to move the overflowing part into one page. Therefore, the number of total pages of the image data can be reduced without largely changing the entire form or format. In addition, when performing printing based on the image data, the number of paper sheets to be consumed in printing can be reduced. In addition, when performing transmission or storing of the image data, data quantity of the entire image data can be reduced. In this way, waste of paper sheets, power consumption, or storage capacity can be eliminated.

In addition, the input unit is at least one of the image reading device 1 that reads the set document so as to generate the image data, and the communication unit 7 that receives the image data transmitted from the computer 200. The output unit is at least one of the printing unit 3 that performs printing based on the output data, the communication unit 7 that performs transmission based on the output data, and the storage unit 5 that stores the output data in a nonvolatile manner.

In this way, it is possible to reduce the number of total pages in printing or a data size in transmission based on the image data obtained by reading the document, the image data transmitted from the computer 200, or the image data stored for reuse in the image forming device (multifunction peripheral 100).

Although the embodiment of the present invention is described above, the present invention is not limited to this but can be variously modified for implementation within the scope of the invention without deviating from the spirit thereof.

INDUSTRIAL APPLICABILITY

The present invention can be used for image forming devices that perform printing or transmission of image data.

The invention claimed is:

1. An image forming device comprising:
   an input unit configured to input image data for executing a job;
   an image processing unit configured to perform image processing based on the image data input to the input unit, to generate output data, and to perform a vertical width compaction process in the image processing, the vertical width compaction process including
     recognizing a field enclosed by borders in a page of the image data,
     determining whether or not the recognized field is a vertical width compaction candidate field including a blank from left end to right end of the field, the blank having a predetermined width or more in the vertical direction,
     setting a band-like vertical omission band from the left end to the right end of the page overlapping an area of the determined vertical width compaction candidate field,
     setting the vertical omission band so as to include the blank and a part of borders of the vertical width compaction candidate field but not to delete information, and
     deleting the set vertical omission band in the image data so as to shift and compact the image data below the vertical omission band in the upward direction; and
   an output unit configured to perform the job based on the output data;
   wherein the image processing unit:
   determines a last page description width in the vertical direction from upper end to lower end of information described in the last page of the image data, deletes the vertical omission bands one by one in a predetermined order, and finishes the vertical width compaction process when the sum of the widths in the vertical direction deleted as the vertical omission band becomes the last page description width or more, and
   performs the vertical width compaction process when the last page description width is a predetermined first reference value or less and does not perform the vertical width compaction process when the last page description width is more than the predetermined first reference value.

2. The image forming device according to claim 1, wherein the image processing unit recognizes the fields in all pages of the image data, determines whether or not the recognized field is the vertical width compaction candidate field, sets the vertical omission bands, and deletes all the set vertical omission bands.

3. The image forming device according to claim wherein the image processing unit sets the first reference value to a larger value as the number of total pages of the image data included in one job is larger, and sets the first reference value to a smaller value as the number of total pages of the image data included in one job is smaller.

4. The image forming device according to claim 1, wherein the image processing unit sets the vertical omission band so that the vertical width of the vertical width compaction candidate field after the width compaction becomes a predetermined reserved width or more.

5. The image forming device according to claim 1, wherein
   the input unit is at least one of an image reading device configured to read a set document so as to generate the image data, and a communication unit configured to receive the image data transmitted from a computer, and
   the output unit is at least one of a printing unit configured to perform printing based on the output data, a communication unit configured to perform transmission based on the output data, and a storage unit configured to store the output data in a nonvolatile manner.

6. The image forming device according to claim 1, wherein the image processing unit sets the vertical omission band so that the vertical width of the vertical width compaction candidate field after the width compaction becomes a predetermined reserved width or more.

7. An image forming device comprising:
   an input unit configured to input image data for executing a job;
   an image processing unit configured to perform image processing based on the image data input to the input unit, to generate output data, and to perform a vertical width compaction process in the image processing, the vertical width compaction process including
     recognizing a field enclosed by borders in a page of the image data,
     determining whether or not the recognized field is a vertical width compaction candidate field including a blank from left end to right end of the field, the blank having a predetermined width or more in the vertical direction,
     setting a band-like vertical omission band from the left end to the right end of the page overlapping an area of the determined vertical width compaction candidate field,
     setting the vertical omission band so as to include the blank and a part of borders of the vertical width compaction candidate field but not to delete information, and
     deleting the set vertical omission band in the image data so as to shift and compact the image data below the vertical omission band in the upward direction; and
   an output unit configured to perform the job based on the output data;
   wherein the image processing unit determines a remaining width as a width in the vertical direction from upper end to lower end of information described in the last page of the image data after the vertical width compaction process, and deletes upper and lower margins of the page in one or more pages included in the image data so as to reduce the number of total pages when the remaining width is smaller than a predetermined second reference value.

8. The image forming device according to claim 7, wherein the image processing unit sets the vertical omission band so that the vertical width of the vertical width compaction candidate field after the width compaction becomes a predetermined reserved width or more.

9. The image forming device according to claim 7, wherein the input unit is at least one of an image reading device configured to read a set document so as to generate the image data, and a communication unit configured to receive the image data transmitted from a computer, and the output unit is at least one of a printing unit configured to perform printing based on the output data, a communication unit configured to perform transmission based on the output data, and a storage unit configured to store the output data in a nonvolatile manner.

10. The image forming device according to claim 7, wherein the input unit is at least one of an image reading device configured to read a set document so as to generate the image data, and a communication unit configured to receive the image data transmitted from a computer, and the output unit is at least one of a printing unit configured to perform printing based on the output data, a communication unit configured to perform transmission based on the output data, and a storage unit configured to store the output data in a nonvolatile manner.

11. An image forming device comprising:

an input unit configured to input image data for executing a job;

an image processing unit configured to perform image processing based on the image data input to the input unit, to generate output data, and to perform a vertical width compaction process in the image processing, the vertical width compaction process including recognizing a field enclosed by borders in a page of the image data, determining whether or not the recognized field is a vertical width compaction candidate field including a blank from left end to right end of the field, the blank having a predetermined width or more in the vertical direction, setting a band-like vertical omission band from the left end to the right end of the page overlapping an area of the determined vertical width compaction candidate field, setting the vertical omission band so as to include the blank and a part of borders of the vertical width compaction candidate field but not to delete information, and deleting the set vertical omission band in the image data so as to shift and compact the image data below the vertical omission band in the upward direction; and an output unit configured to perform the job based on the output data;

wherein the image processing unit performs a horizontal width compaction process, including recognizing the fields in a page of the image data, detecting blank areas included in the fields and blank areas outside the fields, setting a band-like horizontal omission band from upper end to lower end of the page, including a blank in at least one field, setting the horizontal omission band so as to delete the blank and a part of borders in the horizontal direction of the field but not to delete information, and deleting the horizontal omission band in the image data so as to shift the image data on the right or left side of the horizontal omission band as a compaction process in the horizontal direction.

* * * * *